United States Patent [19]

Liu et al.

[11] Patent Number: 5,113,101

[45] Date of Patent: May 12, 1992

[54] WATERTIGHT SEAL FOR PLUG-IN TYPE POTHEAD

[75] Inventors: Joseph C. Liu; Brown L. Wilson, both of Tulsa, Okla.

[73] Assignee: Oil Dynamics, Inc., Tulsa, Okla.

[21] Appl. No.: 653,699

[22] Filed: Feb. 11, 1991

[51] Int. Cl.$^5$ .................. H02K 5/132; H01R 13/426; F04D 13/08

[52] U.S. Cl. .................................. 310/87; 174/75 D; 310/71

[58] Field of Search .................... 310/71, 87; 439/271, 439/273, 274, 275, 279; 174/75 D, 76, 77 R; 277/105

[56] References Cited

U.S. PATENT DOCUMENTS

| | | | |
|---|---|---|---|
| 2,049,749 | 8/1936 | Roth | 174/75 D |
| 2,050,294 | 8/1936 | Edmonds | 174/75 D |
| 4,050,765 | 9/1977 | Duesterhoeft et al. | 439/205 |
| 4,123,133 | 10/1978 | Pickett et al. | 439/275 |
| 4,456,844 | 6/1984 | Yamamoto et al. | 310/87 |
| 4,626,721 | 12/1986 | Ouchi | 310/87 |

Primary Examiner—Steven L. Stephan
Assistant Examiner—D. L. Rebsch
Attorney, Agent, or Firm—Head & Johnson

[57] ABSTRACT

A plug-in type pothead includes specially designed seal sleeves formed from a heat shrinkable polymer. One end of the sleeve has an annular collar about it which, when snugly fitted within the motor lead entry hole of the terminal block, forms a watertight seal between the terminal block and the sleeve. The other end of each of the sleeves is heat shrunk about its respective motor lead to form a watertight seal between the sleeve and the lead. In addition, a gasket between the connecting face of the terminal block and the connecting face of the pothead provides a watertight seal between the pothead and the terminal block. The result is a completely watertight connecting system, extending from the pothead through the terminal block to the motor leads.

17 Claims, 2 Drawing Sheets

WATERTIGHT SEAL FOR PLUG-IN TYPE POTHEAD

BACKGROUND OF THE INVENTION

This invention relates generally to submersible electrical pumps and more particularly concerns potheads used to connect the submersible motors of such pumps to an electrical power source.

There are presently two types of pothead designs employed with submersible pumps. "Tape-in" type potheads include layers of insulation tape wrapped around individual electrical terminals to prevent electrical contact from occurring across phases or to ground of the power system. In this type of system, if water enters the motor, the terminals are not affected because of the insulation tape. However, installation of the "tape-in" pothead is extremely time consuming since each of the terminals must be individually wrapped. "Plug-in" type potheads include motor leads with male or female terminals preassembled in a terminal block secured in the motor head. These terminals plug into female or male terminals on the pothead. This arrangement saves time during installation but all the live terminals are exposed within the terminal block. If water entry connects the live terminals to each other or to ground, an electrical fault will occur in the system.

It is, therefore, an object of this invention to provide a plug-in type pothead in which the electrical terminals are insulated in a watertight seal preventing electrical fault in the system due to penetration of water.

SUMMARY OF THE INVENTION

In accordance with the invention a plug-in type pothead includes specially designed seal sleeves formed from a heat shrinkable polymer. One end of the sleeve includes an integral annular collar which, when snugly fitted within the motor lead entry hole of the terminal block, forms a watertight seal between the terminal block and the sleeve. The other end of each of the sleeves is heat shrunk about its respective motor lead to form a watertight seal between the sleeve and the lead. In addition, a gasket disposed between the connecting face of the terminal block and the connecting face of the pothead provides a watertight seal between the pothead and the terminal block. The result is a completely watertight connecting system extending from the pothead through the terminal block to the motor leads.

BRIEF DESCRIPTION OF THE DRAWINGS

Other objects and advantages of the invention will become apparent upon reading the following detailed description and upon reference to the drawings in which.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 1:
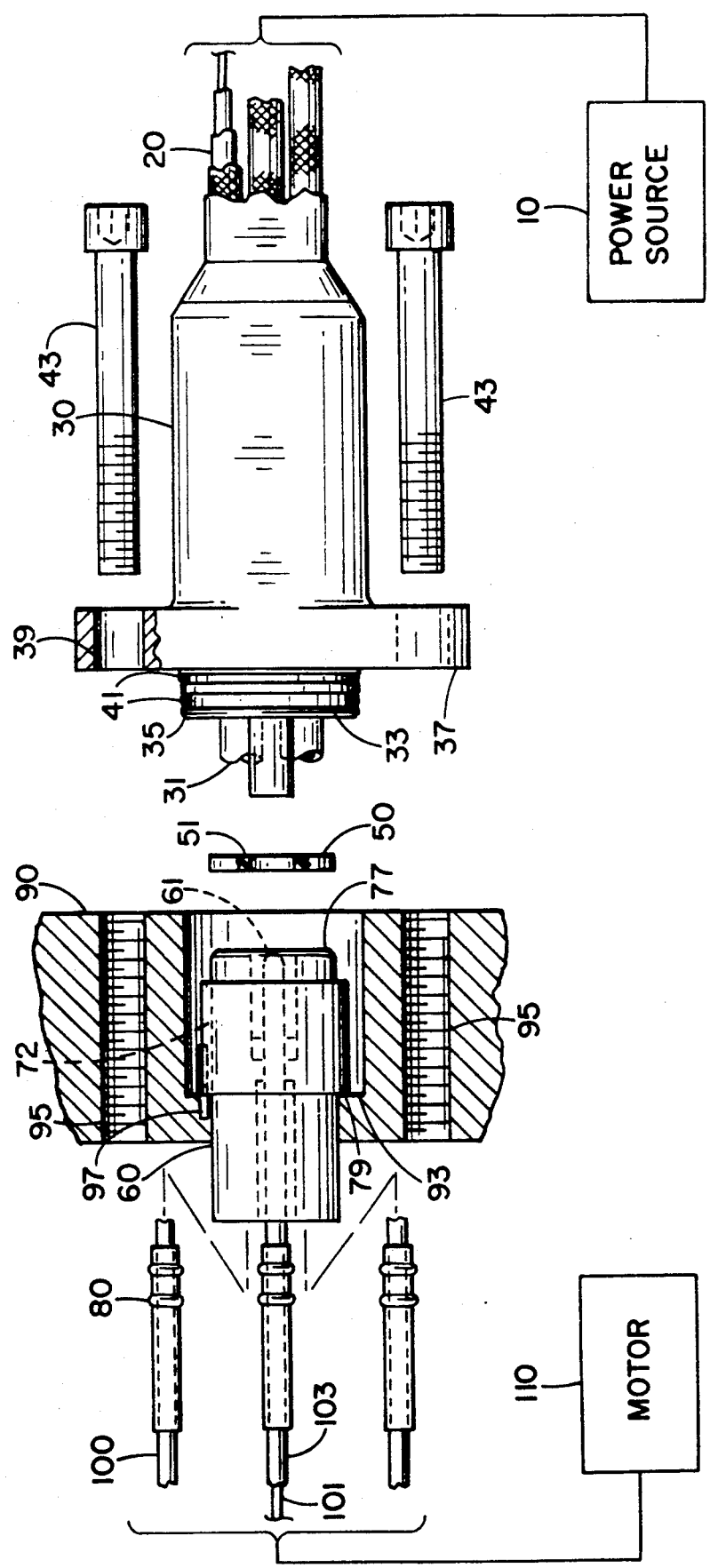
FIG. 1 is a cross-sectional view illustrating the interconnection of lead wires of a submersible motor through a terminal block and a pothead to the power lines of a power source.

Turning first to FIG. 1, the electrical paths extending from a power source 10 to a three-phase submersible motor 110 are illustrated. The power source 10 is connected by power lines 20 to a pothead 30 having female electrical terminals 31 which are to be mated with the male electrical terminals 61 of a terminal block 60 which are in turn connected to motor lead wires 100. The power lines 20, the pothead 30, the terminal block 60 and the lead wires 100 are typical of what is used in the field today. However, a gasket 50 and sleeves 80 used at the connection points between the pothead 30 and the terminal block 60 and between the terminal block 60 and the motor leads 100, and other modifications to the pothead 30 and the terminal block 60 in conjunction with the gasket 50 and sleeves 80 result in a watertight system not provided by the prior art.

The motor lead wires 100 typically include a plurality of electrical conductors 101, each one being encased in an electrical insulating and water impervious sheath 103. The sheath 103 may itself consist of a plurality of layers of material to accomplish these purposes. One end of each lead wire 101 is connected to the motor winding while its other end terminates in a male electrical connector 61 to be inserted or plugged into a mating female connector 31 on the pothead 30.

Figure 3:
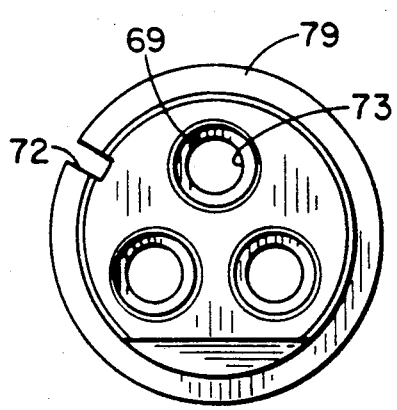
FIG. 3 is an end view taken along the lines 3—3 of FIG. 2.
Figure 2:
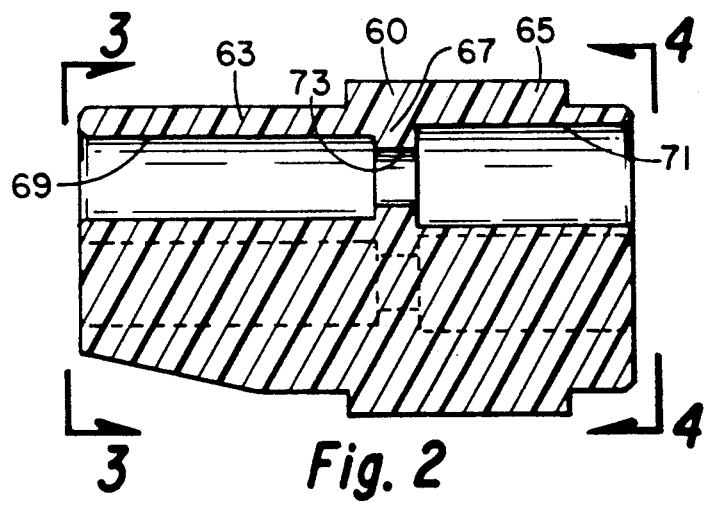
FIG. 2 is a cross-sectional view of a terminal block according to the invention.
Figure 5:
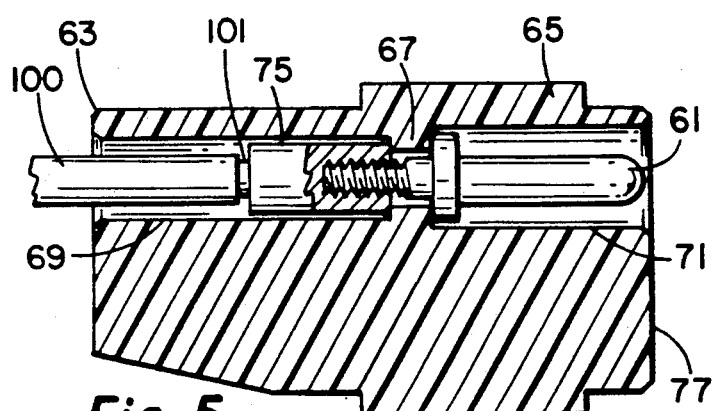
FIG. 5 is a cross-sectional view of the terminal block of FIG. 2 including the motor lead wires and male connectors mounted therein.
Figure 4:
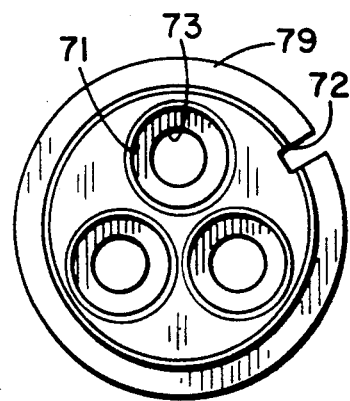
FIG. 4 is an end view taken along the lines 4—4 of FIG. 2.

The lead wires 100 and their respective male electrical connectors 61 are mounted in a terminal block 60 illustrated in FIGS. 2 through 4. In the preferred embodiment, the terminal block 60 is a substantially cylindrical, teflon unit, though other external configurations and high dielectric thermal plastic materials may be employed. The block 60 has a lead wire portion 63 and a plug-in portion 65 joined together by an intermediate portion 67. The lead wire portion 63 has a plurality of cylindrical holes 69 axially aligned with the longitudinal axis of the terminal block 60 into which lead wires 100 may be inserted. The plug-in portion 65 has a plurality of cylindrical holes 71 aligned with those in the lead wire portion 63 side into which the male electrical terminals 61 may be inserted. As shown, the lead wire holes 69 are smaller in diameter than the electrical connector holes 71 and each aligned pair of holes is connected by a hole 73 through the intermediate portion of the terminal block 60 of smaller diameter than the holes 69 and 71 it interconnects. Thus, as is illustrated in FIG. 5, when a threaded electrical connector 75 soldered to the end of the electrical conductor 101 is inserted into one of the holes 69 in the lead wire portion 63 of the block 60, a complementarily threaded male electrical connector 61 inserted in its respective plug-in portion 65 of the block 60 can be screwed into the connector 75 to secure the lead wire 100 and the male connector 61 in place in the block 60. For normal three phased motor connections, this will require three sets of holes 69, 71 and 73 and terminals 61 in the terminal block 60.

As can be seen in FIG. 5, any water that might be present near the lead wire or plug-in wire holes 69 or 71 could find its way to the connecting face 77 of the terminal block 60 and result in a short circuit between the male electrical terminals 61 or to ground. To prevent this, a watertight seal is necessary between the water impervious lead wire sheath 103 and the water impervious terminal block 60 and also between the water impervious terminal block 60 connecting face 77 and the connecting face 33 of the pothead 30.

Figure 6:
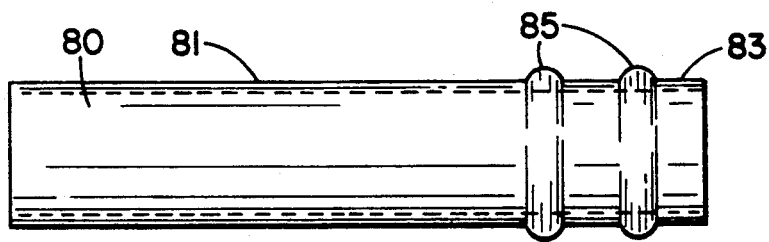
FIG. 6 is a side elevational view of a sealing sleeve according to the present invention.
Figure 7:
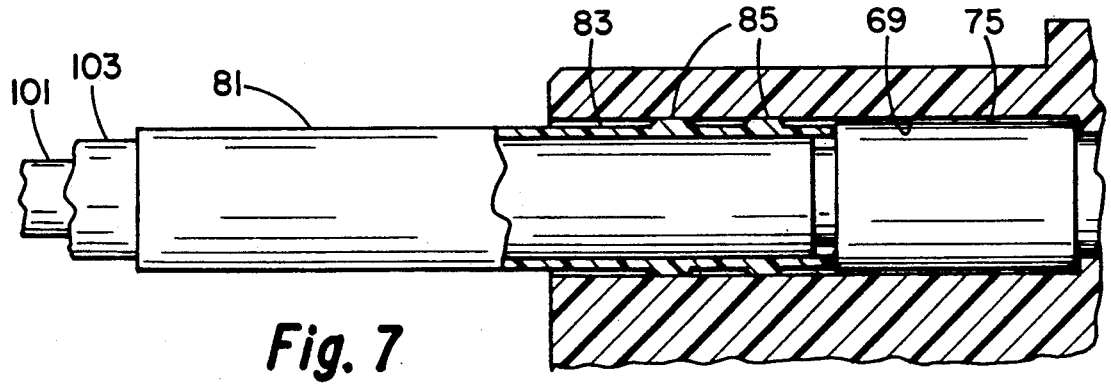
FIG. 7 is a side elevational view with parts broken away illustrating the connections of the terminal block of FIG. 5 incorporating the sleeve of FIG. 6.

To accomplish the watertight seal between the lead wire sheaths 103 and the terminal block 60, sleeves 80 of polymer blend tubing such as "VITON" are provided for each of the lead wires 100. As shown in FIG. 6, each polymer blend tubing sleeve 80 has first 81 and second 83 segments with the same inner and outer diameters. The tubing material is water impervious and heat shrinkable to a predetermined inner diameter. The inner diameter of the sleeves 80 is selected to somewhat snugly encase the water impervious sheath of the lead wire 100 which may be inserted into the first or exterior segment 81 of the sleeve 80. The outer diameter of the sleeve 80 is such that the second or interior segment 83 may be freely inserted into the lead wire hole 69 of the terminal block 60. This interior segment 83 of the sleeve 80 has at least one and preferably two annular collars 85 spaced along the interior segment 83 with the outer diameters of the collars 85 being slightly greater than the diameter of the lead wire holes 69 in the terminal block 60. Thus, when the sleeve 80 containing the lead wire 100 is inserted into the hole 69 in the terminal block 60, the collars 85 on the sleeve 80 will be snugly fitted against the surface of the holes 69 to provide a watertight seal between the sleeve 80 and the terminal block 60. Heat may then be applied to the exterior segment 81 of the sleeve 80 at a temperature below the destructive temperature of the polymer blend tubing but in excess of the temperature necessary to shrink the exterior segment 81 of the sleeve 80 to its predetermined inner diameter. The interior segment 83 remains in its pre-established dimension and is not responsive to the heat. Thus, a watertight seal results between the sleeve 80 and its respective water impervious lead wire sheath 103. Thus, the lead wire sheath 103, the heat shrinkable portion 81 of the sleeve 80, the compressed collar portion 85 of the sleeve 80 and the terminal block 60 provide a watertight electrical path from the motor 110 to the connecting face 77 of the terminal block 60.

To complete the watertight path to the pothead 30, a gasket 50 having a diameter substantially equal to the diameter of the connecting face 77 of the terminal block 60 and having three apertures 51 sized and aligned to be seated over the insulated female electrical terminals 31 of the pothead 30 is mounted over the connecting face 33 of the pothead 30. In a typical pothead, the connecting face 33 is surrounded by an annular collar 35 and, when the pothead terminals 31 and the terminal block terminals 61 are connected, the connecting face 77 of the terminal block 60 slips into the annular collar 35 until the connecting faces 33 and 77 of the pothead 30 and the terminal block 60 are in close spaced apart relationship. With the gasket 50 inserted in the gap between the connecting faces 33 and 77, a watertight seal is formed between the gasket 50 and the terminal block face 77 to complete the water tight electrical path from the motor 110 through the terminal block 60.

Looking again at FIGS. 2, 3 and 4, the terminal block 60 includes an enlarged cylindrical portion 79 proximate its connecting face 77 end and a groove 72 extending for the length of the terminal block 60. As shown as FIG. 1, the terminal block 60 is seated in the motor head 90. A cavity 91 in the motor head 90 through which the terminal block 60 and the lead wires 100 extend is of such a diameter that a shelf 93 of the motor head 90 will engage with the larger cylindrical portion 79 of the terminal block 60 as the pothead 30 is plugged into the motor head 90. The forward portion of the pothead 30 is provided with apertured flanges 37 which align with apertures 95 extending in the motor head 90. Thus, when the terminal block 60 is connected to the pothead female terminals 31 with the gasket 50 therebetween, bolts 43 extending through the apertures 95 and 39 in the motor head 90 and the pothead flanges 37 can be tightened to draw the connecting faces 33 and 77 of the pothead 30 and the terminal block 60 into a compressively tight relationship with the gasket 50. In addition, a pin 97 provided on the motor head 90 aligns with the groove 72 along the length of the terminal block 60 when the terminal block 60, the pothead 30 and the motor head 90 are properly aligned, to prevent relative rotation of these parts.

Finally, O-rings 41 seated around the cylindrical collar 35 of the pothead 30 engage against the surface of the motor head 90 to provide a snug connection with the terminal block 60.

In assembling the terminal block 60 to the lead wires 100 of the submersible motor 110, a heat shrinkable sleeve 80 is slipped over each of the motor leads 100. A special tool, such as mating semi-cylindrical members, is used to grip the exterior portion of the sleeves 80 for insertion of the interior portions into the smaller holes 69 in the lead wire segment 63 of the terminal block 60. The lead wires 100 and sleeves 80 are inserted into the holes 69 until the threaded end 75 of the lead wire 100 is fully inserted to the intermediate portion 67 of the terminal block 60 and the collars 85 are snugly fitted in the holes 69. The male electrical terminals 61 may then be screwed into place in the terminal block 60 and the collars 85 provide a water tight seal relationship with respect to the terminal block 60. Heat is then applied to the exterior segment 81 of the heat shrinkable sleeve 80 to shrink this portion of the sleeve 80 tightly around the motor lead 100.

In an alternative method of assembling the terminal blocks 60 to the lead wires 100 of the submersible motor 110, the sleeves 80 may be heat shrinkable over their entire length and the collars 85 separately applied to the sleeve. In this process, a sleeve 80 is slipped over each of the motor leads 100 and shrunk in its entirety to tightly grip the motor lead 100. At least one O-ring is then slipped over the sleeve 80 to form the collar 85 for insertion into the terminal block 60. With the O-rings mounted on the sleeve 80, the O-ring, sleeve and motor lead 100 are pulled into their appropriate aperture on the terminal block 60, for example by use of a threaded rod temporarily threaded to the terminal 75 of the lead wire 100.

As hereinbefore explained, the gasket 50 between the connecting faces 33 and 77 of the pothead 30 and the terminal block 60 prevent water entry between them and the bolting of the pothead 30 to the motor head 90 to draw the terminal block 60 to a position compressing the gasket 50 between the terminal block connecting face 77 and the pothead connecting face 33 completes the desired water tight electrical conducting paths from the submersible motor 110 to the power source 10.

Thus, it is apparent that there has been provided, in accordance with the invention, a watertight seal in plug-in type potheads that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. In combination, a submersible motor, a water impervious terminal block, leads in water impervious sheaths electrically connecting said motor to said terminal block, a water impervious plug-in-type pothead electrically connecting said terminal block to a source of electrical power, means for providing a watertight seal between said terminal block and said pothead and means for providing a watertight seal between said terminal block and each of said leads whereby the electrical paths defined by said leads, said block and said pothead are sealed against penetration by water.

2. A combination according to claim 1, said means for providing a watertight seal between said terminal block and said pothead comprising a gasket and means for compressing said gasket between said terminal block and said pothead.

3. A combination according to claim 1, said terminal block having a plurality of cylindrical holes therethrough, one for receiving an end of each of said leads therein, said means for providing a watertight seal between said terminal block and each of said leads comprising a plurality of water impervious sleeves, one encasing each of said sheaths with an interior segment of said sleeve disposed within its respective hole in said terminal block and an exterior segment of said sleeve extending outside of said terminal block toward said submersible motor, each of said interior segments having at least one annular collar snugly fitted within its respective hole to form a watertight seal between said terminal block and said sleeve and each of said exterior segments being heat-shrunk to form a watertight seal between said sleeve and its respective sheath.

4. For use in connecting a submersible motor to an electrical power source, apparatus comprising:
   a plurality of motor leads, each comprising an electrical conductor encased in an insulating and water impervious sheath;
   a water impervious terminal block having a plurality of cylindrical holes therethrough, one for receiving an end of each of said leads;
   a plurality of water impervious sleeves, one encasing said end of each of said leads, each of said sleeves having an interior segment disposed within its respective hole in said terminal block and an exterior segment disposed outside of said terminal block, each of said interior segments having at least one annular collar snugly fitted within its respective hole to form a watertight seal between said terminal block and said sleeve and each of said exterior segments being heat-shrunk to form a watertight seal between said sleeve and its respective sheath.

5. Apparatus according to claim 4, each of said sleeves comprising a length of polymer blend tubing, said exterior segments of said sleeves being shrinkable to a predetermined inner diameter in response to application of heat at a temperature below the destructive temperature of said tubing without variation of the inner diameter of said interior segments of said sleeves.

6. Apparatus according to claim 4, each of said sleeves comprising a length of polymer blend tubing shrinkable to a predetermined inner diameter in response to application of heat at a temperature below the destructive temperature of said tubing.

7. For watertight connection of a motor head of a submersible motor to a plug-in type pothead of an electrical power source, apparatus comprising:
   a plurality of motor leads, each comprising an electrical conductor encased in an insulating and water impervious sheath and terminating in a male electrical connector;
   a substantially cylindrical water impervious terminal block having a plurality of cylindrical holes axially therethrough, one for receiving each of said male connectors and a proximate portion of its respective conductor and sheath therein;
   a pothead having a connecting face with a plurality of insulated female electrical terminals extending therefrom, one to receive each of said male connectors therein, said face having a cylindrical collar thereabout and at least one O-ring seated about said collar for insertion into said motor head to form a watertight seal along said at least one O-ring when said male connectors are inserted into said female terminals;
   a gasket disposed against said pothead connecting face within said collar;
   means cooperable with said pothead and said motor head for drawing and maintaining said terminal block into a watertight seal with said gasket; and
   a plurality of water impervious sleeves, one encasing each of said sheaths proximate its male connector, each of said sleeves having an interior segment disposed within its respective hole in said terminal block and an exterior segment disposed outside of said terminal block, each of said interior segments having at least one annular collar snugly fitted within its respective hole to form a watertight seal between said terminal block and said sleeve and each of said exterior segments being heat-shrunk to form a watertight seal between s id sleeve and its respective sheath.

8. Apparatus according to claim 7 further comprising;
   an exterior groove extending axially along the length of said terminal block; and
   a pin fixed to the interior of said cover and aligned for slidable insertion into said groove for preventing relative rotation between said motor head and said terminal block.

9. Apparatus according to claim 7, each of said sleeves comprising a length of polymer blend tubing, said exterior segments of said sleeves being shrinkable to a predetermined inner diameter in response to application of heat at a temperature below the destructive temperature of said tubing without variation of the inner diameter of said interior segments of said sleeves.

10. Apparatus according to claim 7, each of said sleeves comprising a length of polymer blend tubing shrinkable to a predetermined inner diameter in response to application of heat at a temperature below the destructive temperature of said tubing.

11. A method of assembling a connector for use in a watertight electrical system connecting a submersible motor to a source of electrical power comprising the steps of:

encasing an end of a water impervious sheath of each of the motor leads in a length of polymer blend tubing having a first segment shrinkable to a predetermined inner diameter in response to application of heat at a temperature below the destructive temperature of said tubing and a second segment capable of maintaining its inner diameter without variation during shrinkage of said first section, said second segment having at least one annular collar thereabout;

gripping each of said first segments between mating semicylindrical casings;

inserting each of said second segments into holes extending through a water impervious terminal block with said first segments external to said terminal;

pushing said collars into a watertight seal condition in said holes by urging the casings against their respective collars;

heating said first segments to a temperature suitable to shrink said first segments into a watertight seal condition with respect to said impervious sheaths.

12. A method according to claim 11 further comprising the steps of:

disposing a gasket on a mounting face of a pothead suitable for mating with said terminal block; and drawing said terminal block into a watertight seal condition against said gasket.

13. A method of assembling a connector for use in a watertight electrical system connecting a submersible motor to a source of electrical power comprising the steps of:

encasing an end of a water impervious sheath of each of the leads of said motor in a length of polymer blend tubing shrinkable to a predetermined inner diameter in response to application of heat at a temperature below the destructive temperature of said tubing;

heating said tubings to a temperature suitable to shrink said tubings into a watertight seal condition with respect to said impervious sheaths;

slipping at least one collar annularly about each said tubing; and pulling each of said sheaths, tubings and collars into a watertight seal condition within corresponding holes extending through a water impervious terminal block.

14. A method according to claim 13 further comprising the steps of:

disposing a gasket on a mounting face of a pothead suitable for mating with said terminal block; and drawing said terminal block into a watertight seal condition against said gasket.

15. In combination, a submersible motor, a water impervious terminal block, leads in water impervious sheaths electrically connecting said motor to said terminal block, a water impervious pothead electrically connecting said terminal block to a source of electrical power, a gasket, means for compressing said gasket between said terminal block and said pothead to provide a tight seal therebetween and means for providing a watertight seal between said terminal block and each of said leads whereby the electrical paths defined by said leads, said block and said pothead are sealed against penetration by water.

16. In combination, a submersible motor, a water impervious terminal block, leads in water impervious sheaths electrically connecting said motor to said terminal block, a water impervious pothead electrically connecting said terminal block to a source of electrical power, means for providing a watertight seal between said terminal block and said pothead and said terminal block having a plurality of cylindrical holes therethrough, one for receiving an end of each of said leads therein, a plurality of water impervious sleeves, one encasing each of said sheaths with an interior segment of said sleeve disposed within its respective hole in said terminal block and an exterior segment of said sleeve extending outside of said terminal block toward said submersible motor, each of said interior segments having at least one annular collar snugly fitted within its respective hole to form a watertight seal between said terminal block and said sleeve and each of said exterior segments being heat-shrunk to form a watertight seal between said sleeve and its respective sheath whereby the electrical paths defined by said leads, said block and said pothead are sealed against penetration by water.

17. In combination, a submersible motor, a water impervious terminal block, leads in water impervious sheaths electrically connecting said motor to said terminal block, a water impervious pothead electrically connecting said terminal block to a source of electrical power, a gasket, means for compressing said gasket between said terminal block and said pothead to provide a tight seal therebetween and means for providing a watertight seal between said terminal block and each of said leads whereby the electrical paths defined by said leads, said block and said pothead are sealed against penetration by water, means for providing a watertight seal between said terminal block and said pothead and said terminal block having a plurality of cylindrical holes therethrough, one for receiving an end of each of said leads therein, a plurality of water impervious sleeves, one encasing each of said sheaths with an interior segment of said sleeve disposed within its respective hole in said terminal block and an exterior segment of said sleeve extending outside of said terminal block toward said submersible motor, each of said interior segments having at least one annular collar snugly fitted within its respective hole to form a watertight seal between said terminal block and said sleeve and each of said exterior segments being heat-shrunk to form a watertight seal between said sleeve and its respective sheath whereby the electrical paths defined by said leads, said block and said pothead are sealed against penetration by water.

* * * * *